No. 827,888. PATENTED AUG. 7, 1906.
J. A. SMETHERS.
DRAFT EQUALIZER.
APPLICATION FILED SEPT. 23, 1905.
2 SHEETS—SHEET 1.
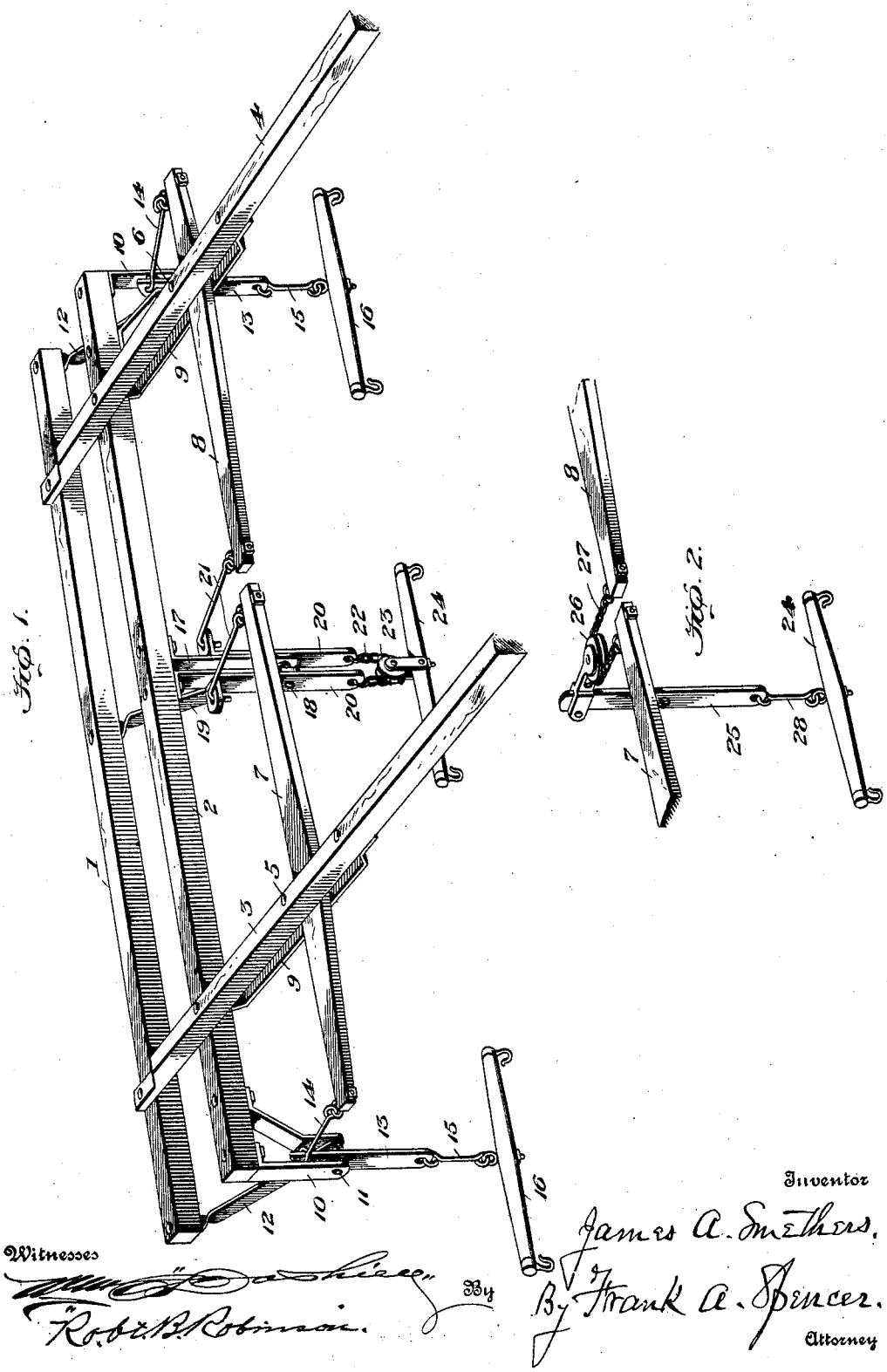

No. 827,888. PATENTED AUG. 7, 1906.
J. A. SMETHERS.
DRAFT EQUALIZER.
APPLICATION FILED SEPT. 23, 1905.
2 SHEETS—SHEET 2.
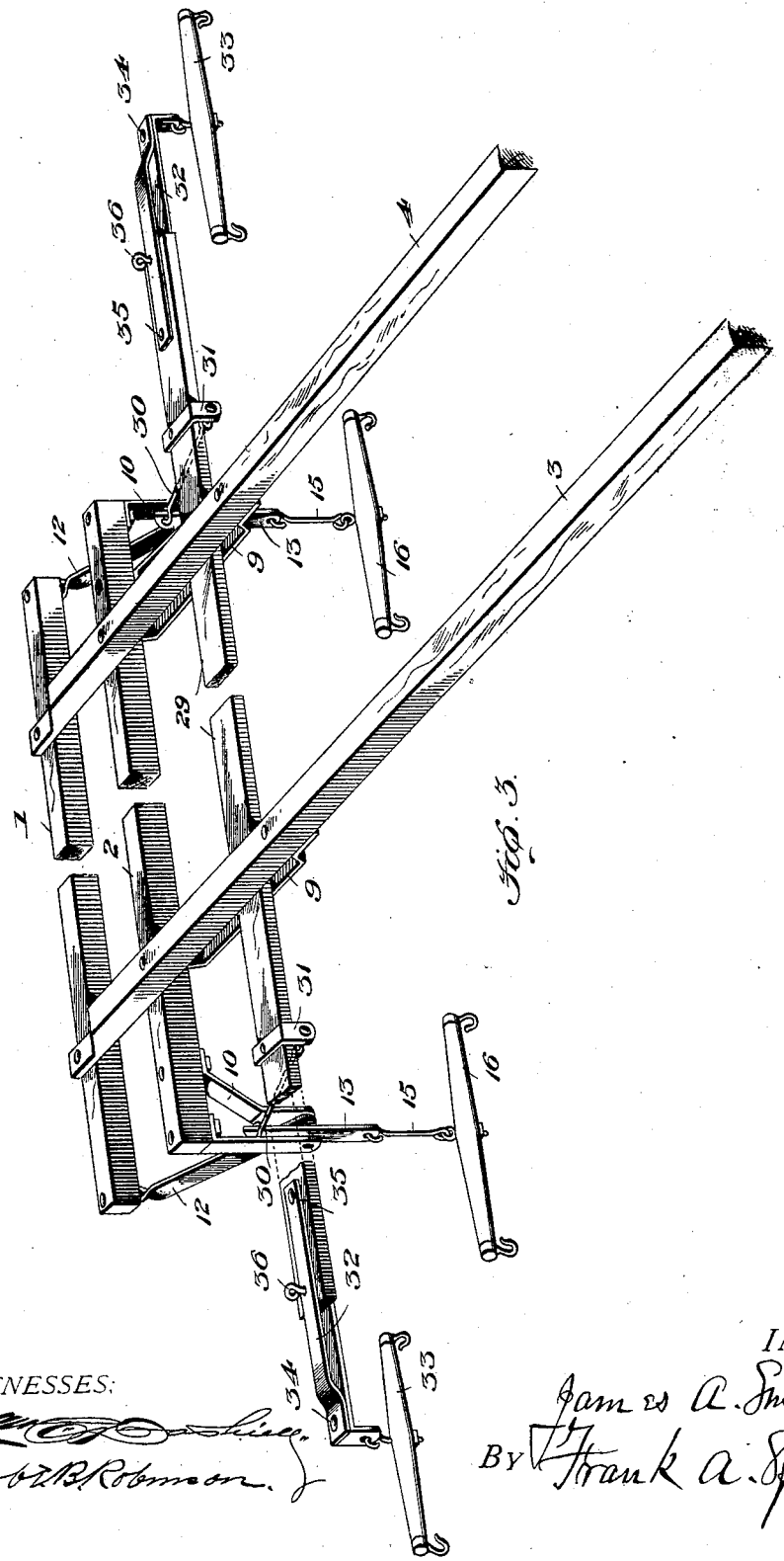
WITNESSES:
INVENTOR
James A. Smethers.
By Frank A. Spencer.
Attorney

UNITED STATES PATENT OFFICE.

JAMES A. SMETHERS, OF BEATRICE, NEBRASKA, ASSIGNOR TO DEMPSTER MILL MANUFACTURING COMPANY, OF BEATRICE, NEBRASKA.

DRAFT-EQUALIZER.

No. 827,888.   Specification of Letters Patent.   Patented Aug. 7, 1906.

Application filed September 23, 1905. Serial No. 279,823.

*To all whom it may concern:*

Be it known that I, JAMES A. SMETHERS, a citizen of the United States, residing at Beatrice, in the county of Gage and State of Nebraska, have invented certain new and useful Improvements in Draft-Equalizers, of which the following is a specification.

My invention relates to improvements in draft-equalizers for cultivators or other implements or vehicles, and has for its object especially to provide new and improved connections whereby the power of the draft-animals is applied to the machine in such a manner as to make three horses available, with an approximately equal draft upon each horse, or in a modification of my device, as shown herein, to make four horses available in a substantially similar manner.

My improvements are of such a character that the four-horse equalizer can be easily and quickly substituted for the three-horse devices in the same machine.

In the accompanying drawings, Figure 1 is a perspective view of the main frame of a cultivator provided with my improvements, the running-gear, gangs of shovels, and all other parts not immediately involved in my improvements being removed. Fig. 2 is a similar view of a modified form of the flexible connections between the doubletrees pivoted on the machine and the swingletree for the middle horse in the three-horse equalizer. Fig. 3 is a perspective view, with parts broken away, of a four-horse equalizer in which my improvements, or a part thereof, are employed.

Referring first to Fig. 1, the numeral 1 indicates the main sill of the frame of the machine, to which sill the stub-axles and various other parts (not shown) are attached. 2 is the forward sill; 3 and 4, the rear portions of the tongues, to which are pivoted at 5 6 the doubletrees 7 8. The stirrups 9 beneath the tongues support the doubletrees when for any reason the pivotal bolts 5 6 are withdrawn. Beneath the outer ends of sill 2 are firmly secured depending hangers or brackets 10, each of which may consist of two members, as shown in the drawings, or they may be formed integral, with a space between the two legs of each at the bottom. On transverse bolts 11, passing through the brackets 10, are secured braces 12, which extend rearwardly and upwardly to the sill 1 or other suitable point of support. Upon said bolts 11 are pivotally mounted the substantially vertical rocking levers 13, the upper ends of which are connected, by means of links 14 or other flexible connections, to the outer ends of the doubletrees 7 8. The lower ends of said levers 13 are connected by links 15 or other flexible connections to the outer swingletrees 16. Under the central portion of sill 2, between the tongues 3 4, is secured the bracket 17 of substantially similar construction to brackets 10. A transverse bolt 18 passes through the legs of the bracket 17 and the lower end of a brace 19, extending to sill 1. Upon said bolt 18 are pivoted two substantially vertical rocking levers 20, each of which is connected at its top by a link 21 or other flexible connection with the inner end of one of the doubletrees 7 8 and at its lower end with a chain or other flexible connection 22, which passes around a sheave 23, secured to the central swingletree 24.

If preferred, the form of the flexible connection in Fig. 2 may be substituted for that in Fig. 1, just described. In this form a single rocking lever 25 is employed, the sheave 26 being secured to its upper end and the chain 27 passing around said sheave and connected to the inner ends of the doubletrees 7 8, the lower end of lever 25 being connected by the link 28 to the swingletree 24.

The doubletrees 7 8 are, as usual, pivoted to the tongues 3 4 at such points as to make the part of the load drawn by the inner horse approximately equal to that drawn by either of the outer horses.

One of the numerous advantages of the construction described is that the power of the draft-animals is applied to the machine at a point low enough to overcome the downward pressure of the tongues upon the horses' necks, while at the same time the pull upon the doubletrees is direct and approximately in the plane of their pivotal movement, a result not usually obtained in machines of this type.

In Fig. 3 I have shown how the three-horse equalizer thus far described may be readily converted when desired into a four-horse equalizer and the same draft devices or a portion of them employed in connection therewith. To effect this, the doubletrees 7 8 (shown in Fig. 1) are removed and instead thereof a long evener-bar 29 is loosely disposed within the supporting-stirrups 9 under the tongues 3 4. Said bar 29 extends entirely across the front of the machine and considerably beyond the ends of the sills 1 and 2. Links 30 connect the upper ends of rocking levers 13 with clips 31, secured on bar 29, and the swingletrees 16 are, as before, connected to the lower ends of said levers. The outer ends of evener-bars 29 are provided with extensions 32, to which are connected the outer swingletrees 33. Each of said extensions 32 consists of a double strap, the two members of which are secured together at their outer ends by bolts or rivets 34 and at their inner ends inclose between them the outer ends of bar 29, to which they are secured by bolts 35 and also by removable pins 36. The object of this construction is to enable the operator to take in the extensions 32 when they interfere with passing through a gateway or other contracted space, as by removing the pins 36 the extensions 32 may be swung either backward or forward on the bolts 35 as pivots, thus materially reducing the width of the machine in this form, which can then be drawn through the gateway by the inner horses.

It will be seen that, as shown in Fig. 3, the pull of the two outer horses tends to draw bar 29 forward, while that of the inner horses tends to draw it back, also that the rocking levers, as shown in all the figures, are drawn upon at their opposite ends by different coacting draft forces or members and that the bolts on which said rocking levers are pivoted form the points at which the united draft power from all sources is applied to the machine.

I claim as my invention and desire to secure by Letters Patent—

1. In a draft-equalizer, the combination of a front cross-bar, brackets depending from said cross-bar, substantially straight and vertically-disposed rocking levers pivoted centrally to said brackets, suitable draft members to receive the traction power, and flexible connections between different coacting draft members and the opposite ends of said levers, substantially as set forth.

2. In a draft-equalizer, a front cross-bar, brackets depending from said cross-bar, substantially straight and vertically-disposed rocking levers pivoted centrally to said brackets, braces connecting said brackets with the frame, suitable coacting draft members, and flexible connections between different coacting draft members and the opposite ends of said levers, substantially as set forth.

3. In a three-horse equalizer, the combination of a front cross-bar, the tongues, the doubletrees pivoted eccentrically on said tongues, in front of said cross-bar, brackets depending from the outer ends and central portion of said cross-bar, substantially straight and vertically-disposed levers pivoted centrally on each of said brackets, swingletrees flexibly connected to the lower ends of said pivoted levers, and flexible connections between the upper ends of said levers and the adjacent ends of the doubletrees, substantially as set forth.

4. In a three-horse equalizer, the combination of a front cross-bar, the tongues, the doubletrees pivoted eccentrically on said tongues, in front of said cross-bar, brackets depending from the outer ends and the central portion of said cross-bar, substantially straight and vertically-disposed rocking levers pivoted centrally on each of said end brackets, and a pair of said levers on said central bracket, swingletrees flexibly connected to the lower ends of each of said end levers, the upper ends of said levers being flexibly connected with the outer ends of the doubletrees, a swingletree flexibly connected to the lower ends of both the inner levers, and flexible connections between the upper ends of said inner levers and the inner ends of the doubletrees, substantially as set forth.

5. In a four-horse equalizer, a front cross-bar, the tongues, the stirrups under the tongues, an evener-bar extending across the machine and through said stirrups, brackets depending from said cross-bar, substantially straight and vertically-disposed levers pivoted centrally in said brackets, flexible connections between the upper ends of said levers and said evener-bar, and between the lower ends of said levers and the draft members, pivoted extensions on the outer ends of said evener-bar, and flexible draft members connected to the extremities of said extensions, substantially as set forth.

In testimony whereof I affix my signature in presence of two witnesses.

JAMES A. SMETHERS.

Witnesses:
  H. W. SCHAFER,
  M. RUMBAUGH.